US012682772B2

(12) United States Patent     (10) Patent No.:   US 12,682,772 B2

Pecina et al.             (45) Date of Patent:      Jul. 14, 2026

(54) METHOD, SYSTEM AND COMPONENTS PROVIDING A SECURE INTERNET CONNECTED AERIAL NETWORK FOR CONTINUOUS DRONE OPERATION AND SURVEILLANCE

(71) Applicant: eve Vehicles Corporation, Austin, TX (US)

(72) Inventors: Roger Pecina, Austin, TX (US); Daniel Donaldson, Austin, TX (US); Markos Salisbury, Austin, TX (US); Henry Cappel, Austin, TX (US); Nicolas Brissonneau, Austin, TX (US); Robert Ersek, Austin, TX (US); Mostafa Fath El-Den, Austin, TX (US)

(73) Assignee: EVE VEHICLES CORPORATION, Austin, TX (US)

( * ) Notice: Subject to any disclaimer, the term of this patent is extended or adjusted under 35 U.S.C. 154(b) by 233 days.

(21) Appl. No.: 18/354,099

(22) Filed: Jul. 18, 2023

(65) Prior Publication Data

US 2024/0021091 A1     Jan. 18, 2024

Related U.S. Application Data

(60) Provisional application No. 63/389,984, filed on Jul. 18, 2022.

(51) Int. Cl.
*G08G 5/56*        (2025.01)
*B64U 10/14*       (2023.01)
          (Continued)

(52) U.S. Cl.
CPC .............. *G08G 5/56* (2025.01); *B64U 10/14* (2023.01); *B64U 10/20* (2023.01); *B64U 20/40* (2023.01);
            (Continued)

(58) Field of Classification Search
CPC ........ B64U 10/20; B64U 20/40; B64U 60/50; B64U 70/90; B64U 10/13
See application file for complete search history.

(56) References Cited

U.S. PATENT DOCUMENTS 11,111,016 B1    9/2021   Pachikov et al.
11,776,136 B1    10/2023   Pachikov et al.
            (Continued)

FOREIGN PATENT DOCUMENTS

CN       213262901 U     5/2021

OTHER PUBLICATIONS

International Search Report and Written Opinion in related International Application No. PCT/US23/70380, dated Jan. 19, 2024, 13 pages.

*Primary Examiner* — Roy Rhee

(74) *Attorney, Agent, or Firm* — Perkins Coie LLP

(57)              ABSTRACT

Systems and methods designed to facilitate a robust and secure aerial network that supports surveillance and delivery operations of electric battery-powered drones. These operations can be conducted in both autonomous and operator-controlled modes. The integrated system utilizes individual drones and base stations, each functioning as nodes within the aerial network and maintaining continuous internet connectivity. The base stations are equipped to serve as recharge and battery swap points for the drones. Furthermore, the network interfaces with a proprietary, secure internet-based application and servers, which enable the coordination and collaboration of drones, autonomous recharging, and comprehensive data collection. This advanced technology has global operability, extending its reach beyond terrestrial boundaries to other celestial bodies, as long as an internet connection is available.

15 Claims, 19 Drawing Sheets

(51) Int. Cl.

| | |
|---|---|
| B64U 10/20 | (2023.01) |
| B64U 20/40 | (2023.01) |
| B64U 30/29 | (2023.01) |
| B64U 60/50 | (2023.01) |
| B64U 70/90 | (2023.01) |
| H04B 7/185 | (2006.01) |
| *B64U 101/64* | (2023.01) |

(52) U.S. Cl.
CPC ............. B64U 30/29 (2023.01); B64U 60/50 (2023.01); B64U 70/90 (2023.01); H04B 7/18502 (2013.01); *B64U 2101/64* (2023.01); *B64U 2201/10* (2023.01); *B64U 2201/20* (2023.01)

(56) References Cited

U.S. PATENT DOCUMENTS

| | | | |
|---|---|---|---|
| 2006/0121818 A1* | 6/2006 | Lee ........................ | B64U 30/10 446/37 |
| 2017/0043870 A1 | 2/2017 | Wu et al. | |
| 2018/0265222 A1* | 9/2018 | Takagi ................... | B64U 80/25 |
| 2020/0184706 A1* | 6/2020 | Speasl ................... | H04L 9/0643 |
| 2024/0166341 A1* | 5/2024 | Wei ........................ | B64C 25/18 |

* cited by examiner

16

201    Receive drone 230 battery level information

202    Estimate drone 230 necessary departure time 260

203    Estimate drone 232 necessary departure time 280

204    Deploy drone 232 at or prior to departure time 280

METHOD, SYSTEM AND COMPONENTS PROVIDING A SECURE INTERNET CONNECTED AERIAL NETWORK FOR CONTINUOUS DRONE OPERATION AND SURVEILLANCE

CROSS-REFERENCED TO RELATED APPLICATION

This application claims the benefit of and priority to U.S. Provisional Application No. 63/389,984, filed Jul. 18, 2022, entitled "A Method, System and Components Providing a Secure Internet Connected Aerial Network For Continuous Drone Operation," the entire contents of which are incorporated herein by reference.

TECHNICAL FIELD

The present disclosure relates generally to a method, system, and components to provide a secure aerial network for electric battery-powered drone surveillance and logistic operations, in autonomous and operator-controlled modes.

BACKGROUND

The advent of unmanned aerial vehicles (UAVs) traces back to 1935 with the inception of the Queen Bee, a drone specifically designed for the British Royal Air Force. It functioned through radio controls and primarily served in battle simulations and air defense system testing. This pioneering creation is universally acknowledged as the progenitor of modern drone technology.

Through the ensuing decades, UAVs have experienced an evolution, taking on multiple forms, with each successive generation representing advancements over its predecessor. Commencing with models like the Israeli Surveillance and Scouting drone, to more contemporary designs such as the DJI Phantom quad-rotor drone, released in 2013, that has indelibly revolutionized the industry's landscape. DJI's innovation has set the industry standard for modern drones, leading to quad-rotor drones becoming the prevalent representation in the current drone industry. Notwithstanding DJI's dominant presence, numerous competitors have surfaced over the last decade, seeking to secure a portion of the burgeoning drone industry.

In the last half-decade, several inventive companies have emerged, proposing distinctive drone-based services spanning aerial photography, drone surveillance, and delivery. The diversification and expansion of drone-based services have primed the sector for further advancements. Companies such as Matternet, Skydio, Sunflower Labs, and DJI are pioneering autonomous drone services, including autonomous delivery, drone-in-a-box surveillance, and surveying. Yet, despite these technological strides, a comprehensive drone network and system remains elusive.

Currently, autonomous surveillance drones are nascent in their technological development. The most advanced systems, such as those developed by DJI, Skydio, and Sunflower Labs, utilize a "Drone-in-a-Box" approach. These systems comprise a drone and an accompanying storage box, which serves as the drone's point of departure and return. In its operational cycle, the drone, following preprogrammed flight instructions, surveys designated private or commercial properties. The storage box, internet-enabled, executes the flight plan, opens to allow the drone to ascend, accepts the drone upon return from surveillance tasks, and facilitates recharging during inactivity.

Despite these advancements, the existing systems exhibit substantial limitations. They lack the capability to operate across multiple properties or to function fully autonomously. Moreover, these preliminary networks do not offer interlinking to facilitate coverage across extensive areas and regions.

A paradigm-shifting autonomous drone network and service should exhibit versatility. It should operate in any location with an internet connection, offer data accessibility to users via a cloud-based application, share base stations among all drones within a network, and maintain the capacity to interlink across aerial networks for expansive drone control and operation.

SUMMARY

The present disclosure is directed to an uncrewed aerial vehicle. The uncrewed aerial vehicle, in various embodiments, may include an elongate body having a first portion comprising a modular payload and a second portion, the first and second portions being separated by a rotor plane extending perpendicular to a longitudinal axis of the elongate body; one or more rotors positioned in the rotor plane; and landing gear extending past a distal end of the second portion such that the uncrewed aerial vehicle can land on a landing surface with the first portion pointing substantially upwards and the second portion pointing substantially downwards.

The one or more rotors, in various embodiments, may include two or more rotors circumferentially spaced apart from one another about an exterior of the elongate body. In an embodiment, each of the two or more rotors may be mounted to a distal end of one or more arms extending outwards from the elongate body. A first end of the landing gear, in an embodiment, may be configured to contact the landing surface, and a second end of the landing gear is rotatably coupled to the uncrewed aerial vehicle and configured to selectably rotate about the rotatable coupling such that the landing gear is situated against or within the one or more arms when in a retracted position. In other embodiments, the one or more rotors may include a single rotor having a plurality of rotor blades extending outwards beyond the elongate body and a rotation axis substantially coincident with the longitudinal axis of the elongate body.

In various embodiments, an entirety of the first portion may be removably attachable to the second portion, while in other embodiments, the first portion of the elongate body may include a first section fixedly coupled to the second portion of the elongate body, and a second section defined by the modular payload, the second section being configured to removably attach to the first section.

The modular payload, in various embodiments, may include an optical device. The optical device, in an embodiment, may be positioned at an upper end of the uncrewed aerial vehicle when the uncrewed aerial vehicle is resting on the landing surface. In another embodiment, the modular payload may include a container having a hollow interior for receiving a delivery item(s).

In another aspect, the present disclosure is directed to a base station for an uncrewed aerial vehicle. The base station, in various embodiments, may include a horizontal surface; and a recess extending below the horizontal surface, the recess having walls that slope inwards from an upper opening of the recess to a bottom of the recess such that the sloped walls guide a portion of an uncrewed aerial vehicle extending below a rotor(s) of the uncrewed aerial vehicle towards a centerline of the recess prior to the uncrewed aerial vehicle coming to rest. One or more dimensions of the recess may be such that the rotor(s) remain above the horizontal surface when the uncrewed aerial vehicle comes to rest on the base station. In an embodiment, the recess is conical or convex in shape.

In some embodiments, a depth of the recess may be smaller than a length of the portion of the uncrewed vehicle extending below the rotor(s) such that the bottom of the recess blocks further insertion of the lower portion of the uncrewed aerial vehicle into the recess, thereby causing the rotor(s) to remain above the recess when the uncrewed aerial vehicle comes to rest in the base station. Additionally or alternatively, in some embodiments, a width of the recess may become smaller than a width of the portion of the uncrewed aerial vehicle extending below the rotor(s) such that the sloped walls block further insertion of the lower portion of the uncrewed aerial vehicle into the recess, thereby causing the rotor(s) to remain above the recess when the uncrewed aerial vehicle comes to rest in the base station. Additionally, or alternatively, an upper opening of the recess may be smaller than a span of the uncrewed vehicle such that at least a portion of the uncrewed aerial vehicle contacts the horizontal surface of the base station, thereby causing the rotor(s) to remain above the recess when the uncrewed aerial vehicle comes to rest in the base station.

In yet another aspect, the present disclosure is directed to a system for automatically controlling a plurality of uncrewed aerial vehicles for maintaining long-term, continuous surveillance of a target location. The system may comprise a wireless network connecting a plurality of uncrewed aerial vehicles and at least one base station configured to recharge or swap a battery of the uncrewed aerial vehicles; and a server comprising one or more physical processors and non-transitory computer-readable media storing instructions executable by the one or more physical processors to perform a method via the wireless network. The method may include receiving, from a first uncrewed aerial vehicle deployed at the target location, information concerning a battery level of first uncrewed aerial vehicle; estimating, based on the received information and a distance between the target location and a location of the base station, a first time by which the first uncrewed aerial vehicle must depart from the target location in order to reach the base station; estimating, based on a distance between the target location and a location of a second uncrewed aerial vehicle of the plurality of uncrewed aerial vehicles, a second time by which the second uncrewed aerial vehicle must depart to reach the target location prior to the first time; and deploying, prior to the second time, the second uncrewed aerial vehicle to the target location. The wireless network, in various embodiments, may include a mesh network having one or more direct or indirect communications links between the plurality of uncrewed aerial vehicles and the at least one base station.

In various embodiments, estimating the first time may be further based upon information regarding flight conditions between the target location and the location of the base station, and estimating the second time may be further based upon information regarding flight conditions between the target location and the location of the second uncrewed aerial vehicle.

The method, in various embodiments, may further include commanding the plurality of uncrewed aerial vehicles to land upon arriving at the target location so as to conserve battery power while conducting surveillance of the target area. Additionally, or alternatively, the method, in various embodiments, may include commanding, prior to the first time, the first uncrewed aerial vehicle to fly to the base station.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
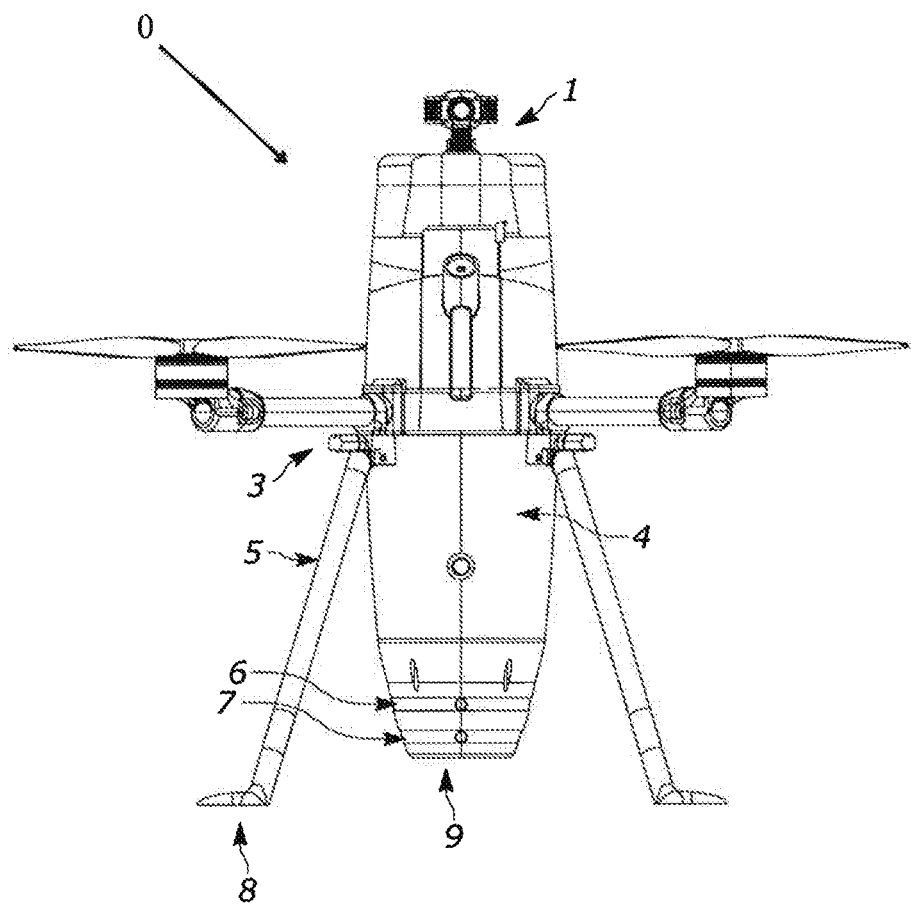
FIG. 1 shows a front view of the drone in landing mode.

The present disclosure is directed to systems and methods for facilitating a secure aerial network. This network is designed to support drone surveillance and delivery operations, enabled for both autonomous and operator-controlled modes. Systems and methods of the present disclosure integrate specific hardware and software components, including individual drones, base stations, and an internet-based platform.

The drone hardware is structured to maintain internet connectivity, allowing each unit to operate as a node within the aerial network. Additionally, the drones and base stations are equipped to act as nodes in a mesh network, enabling seamless operation even in the absence of an internet connection. Each drone is outfitted with a flight controller, an onboard companion computer for running advanced computation tasks, computer vision and other AI/ML models, real time kinematics (RTK) GPS, radio antennas, cellular radio module, speaker and microphone for two-way communication, power management system, lithium-ion battery pack, electronic speed controllers, motors, propellers, landing gear, a contact charging tail, infrared camera, lidar sensor, collision avoidance sensors, and either both or one a top mounted modular payload and bottom mounted modular payload. These components and network allow a multitude of drones to function independently or collectively across a designated area, gathering data. The control of these drones and the collection of aerial data are enabled through a secure, internet-based platform or locally via the mesh network in situations where internet connectivity is unavailable.

This platform provides operators the means to assume control of either individual or multiple drones within the aerial network and issue a variety of commands and instructions for task execution. A key feature of this technology is its broad range of operability; the drones and base stations, all internet-connected and mesh network-enabled, can be controlled from any location on Earth or other celestial bodies, given the presence of an internet connection or a local mesh network. Access to the system is provided through a proprietary, secure internet-based application that interfaces with our servers and executes proprietary software, accessing databases hosted on these servers. Flight telemetry data, along with any other sensor data collected from drone operations will be recorded and stored in a secured database for reference and verification. In the preferred embodiment, operational data is minted onto a blockchain ledger in order to provide an unalterable chain of drone operations data; this blockchain data could be used for emergency response data storage, evidence verification, and flight operation logs just to name a few implementations.

In the preferred embodiment, drones may include a long cylindrical body with a central flight plane, a modular payload compartment located at the top, and deployable landing gear. This landing gear enables drones to perch on top of structures and buildings. The payload compartment is modular and can accommodate either an Intelligence Surveillance and Reconnaissance (ISR) payload or a delivery payload. This flexible design allows operators to swiftly set up either one or both ISR and delivery networks. Additionally, the drone design overcomes a significant limitation of existing models. By positioning the camera on top, it can maintain surveillance functionality even while perched, thereby conserving energy.

The drone is further supported by one or more base stations, also connected to the internet and part of the mesh network. In the preferred embodiment, the base stations may include some or all of the following components: an onboard computer, power station and inverter, smart charger, power relays, infrared beacon, RTK GPS base station, docking funnel, meteorological sensors, deconfliction radar system, and either one or both charging contacts and a battery swapping mechanism. These base stations function as recharge stations or battery swap stations. The docking mechanism of the base station involves an inverted funnel on the top surface, designed to interact with the drone's tail end. This innovative design allows for precise docking under most weather conditions, ensuring proper connection for charging. Moreover, the base station is equipped to serve every drone within a network In application, the user can access their drone fleet through the secure web-based application and execute specific tasks and commands for the drones. For instance, the user may instruct a drone to survey a four-block area. Once the drone receives this command via its internet connection, it navigates to the designated area, identifies a landing position, and initiates surveillance. When the drone's battery reaches a critical level, it signals the network, and another drone replaces it, ensuring no interruption in surveillance. The drone then autonomously returns to the nearest base station for recharging. After the drone verifies sufficient charge, the drone is ready for redeployment to the designated area(s).

Uncrewed Aerial Vehicle 0

FIGS. 1-6 show multiple angles of a representative embodiment of an uncrewed aerial vehicle 0. For simplicity, uncrewed aerial vehicle 0 may be referred to herein as a "drone" however, the use of the term "drone" is not intended to in and of itself confer any additional meaning or context to the generally understood definition of an uncrewed aerial vehicle—that is, an aircraft without any human pilot, crew, or passengers onboard. Uncrewed aerial vehicle in various embodiments, may be operated in any manner including any one or a combination of manual remote control, autonomous or semi-autonomous remote control, onboard autonomous or semi-autonomous sensing and controls, and the like. Further, it should be noted that while different reference numbers may be used for uncrewed aerial vehicle 0 when describing the systems and methods discussed in the context of FIGS. 10-18 (e.g., drone 18, drone 23, drone 27, drone 31, drone 36, drone 42, drone 48, drone 51, drone 55), each generally refers to the various embodiments of drone 0 described herein.

Drone 0, in various embodiments, may have an elongate body 2 (see FIG. 3) and one or more rotors 10 (see FIG. 2), each comprising one or more rotor blades. In the embodiment shown, rotors 10 are mounted to the distal ends of one or more arms 66 extending outwards from the elongate body 2 (see FIG. 4). In another embodiment (not shown), one or more rotors 10 may be mounted in-line with elongate body 2, such that a rotation axis of rotor(s) is substantially coincident with the longitudinal axis 60 of elongate body 2 and rotor blade(s) extend outwards beyond elongate body 2. In various embodiments, rotor(s) 10 may be protected by propeller guards (not shown).

Figure 2:
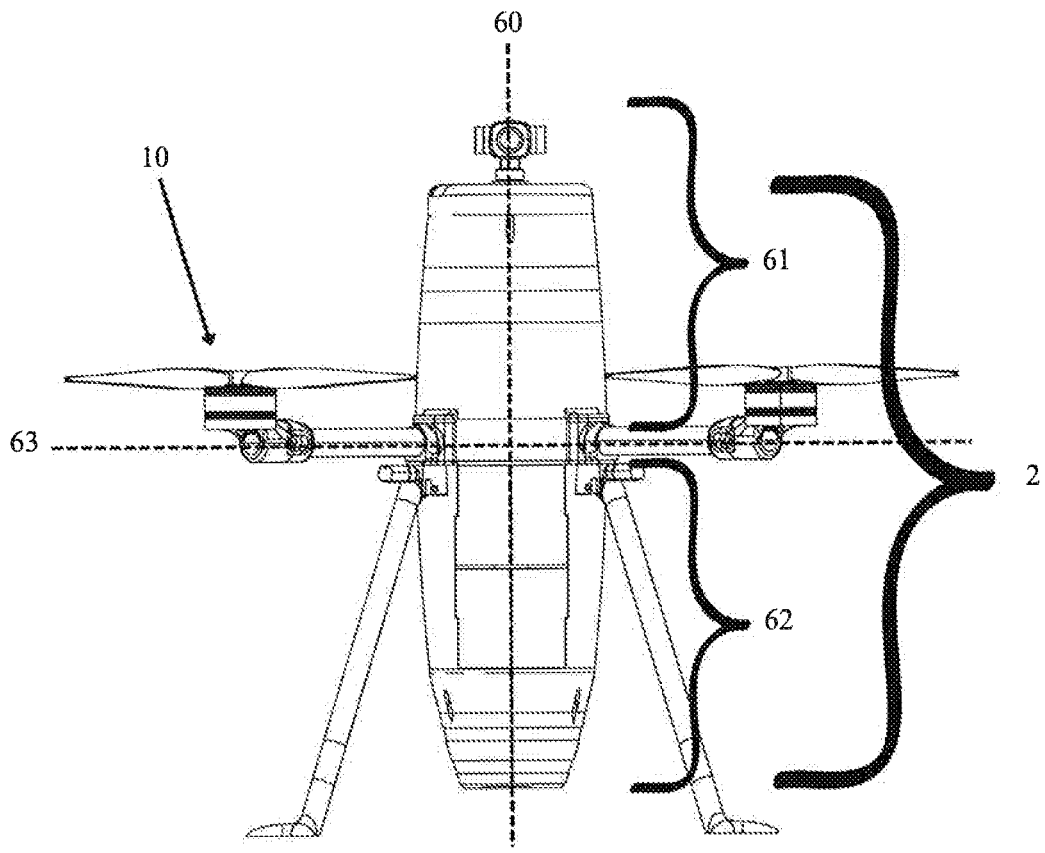
FIG. 2 shows a side view of the drone in landing mode.
Figure 3:
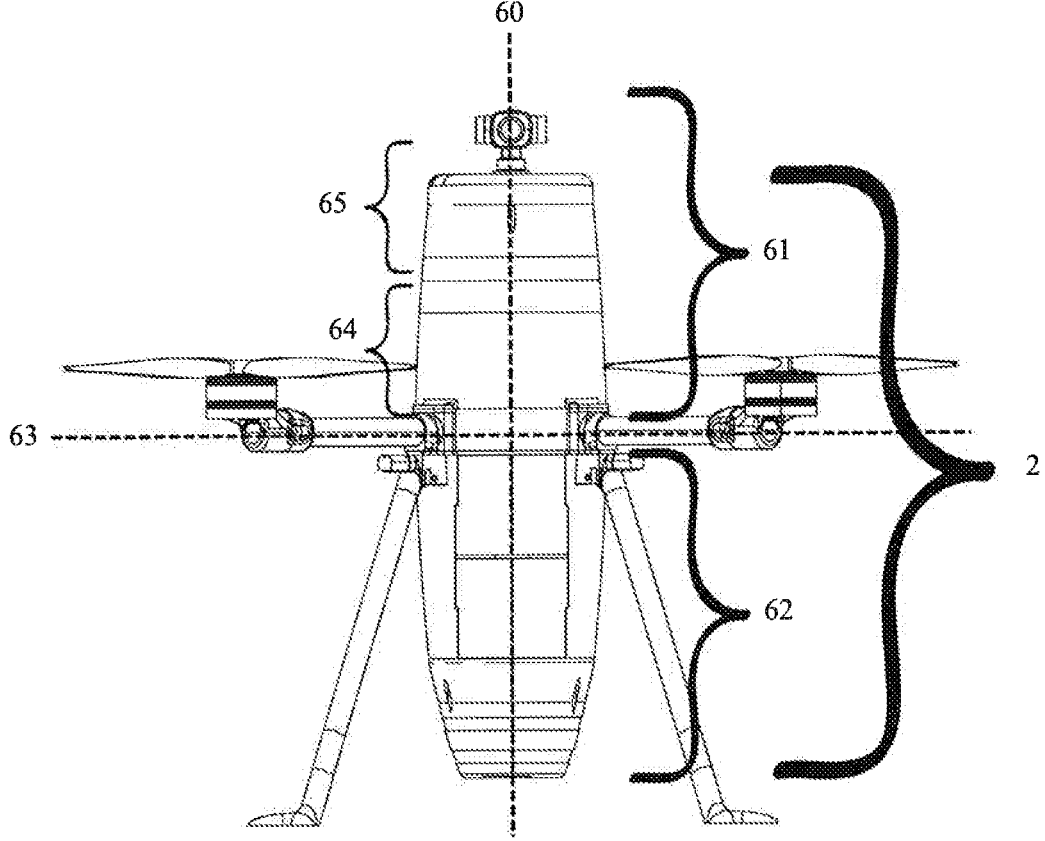
FIG. 3 shows a side view of another embodiment of the drone in landing mode.
Figure 4:
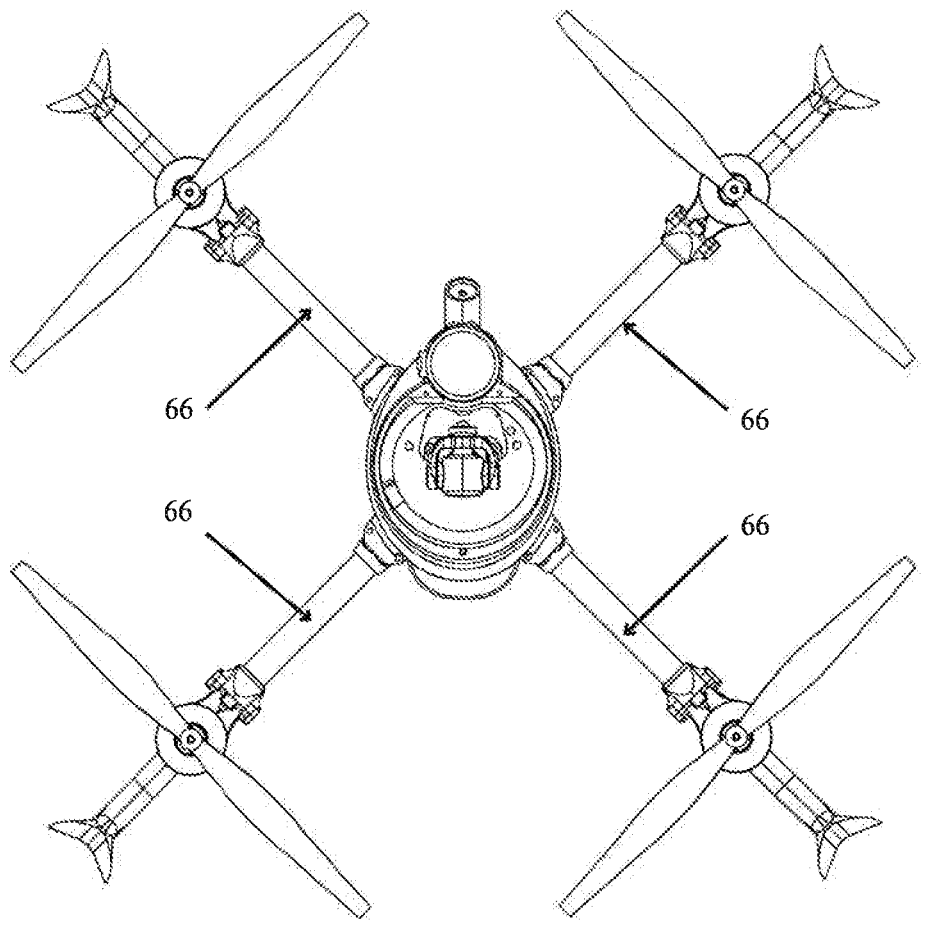
FIG. 4 shows a top view of the drone in flight mode.
Figure 5:
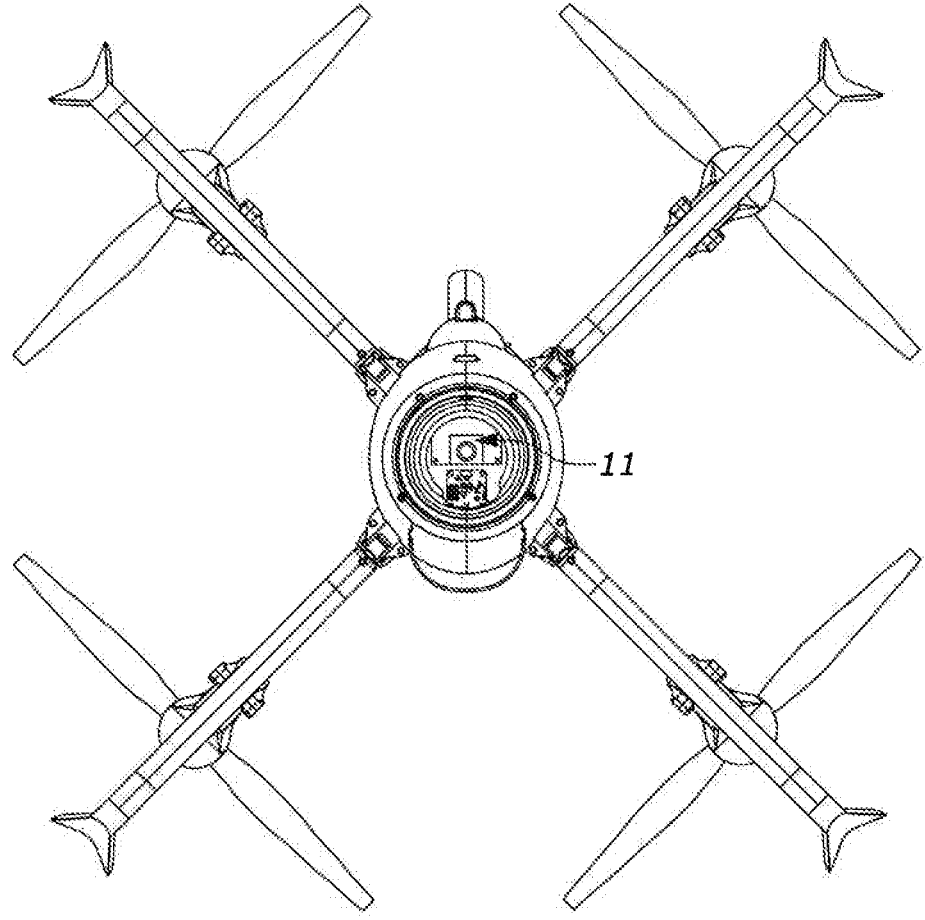
FIG. 5 shows a bottom view of the drone in flight mode.

With reference to FIG. 2 and FIG. 3 in particular, body 2 of drone 0, in various embodiments, may have a first portion 61 and a second portion 62 separated by a rotor plane 63 extending substantially perpendicular to a longitudinal axis 60 of the elongate body 2. First portion 61, in various embodiments, may be removably attachable to second portion 62 as shown in FIG. 2 and comprise a modular payload such as an Intelligence Surveillance and Reconnaissance (ISR) payload with an optical device 1 such as a camera, image sensor, or the like (optical device 1 may be referred to herein as a "camera" for simplicity) or a container (not shown) having a hollow interior for receiving a secondary payload, such as delivery items. Additionally, or alternatively, first portion 61, in various embodiments, may itself comprise a first section 64 and a second section 65, wherein first section 64 is fixedly coupled to second portion 62 of elongate body 2 and second section 65 is configured to removably attach to first section 64, as shown in FIG. 3. In such a configuration, second section 62 may be the modular payload. In another embodiment, first section 64 of first portion 61 may be removably coupled to second portion 62 of elongate body 2 and second section 65 is configured to removably attach to first section 64. As configured, first portion 61 of elongate body 2 may comprise two modular sections—that is, first section 64 and second section 65—allowing various modular payloads to be stacked, rearranged in various configurations (possibly to facilitate weight and balance, ease of access to certain modular payloads, and/or field of view of an optical device 1), and selectably swapped out.

Positioning the modular payload on an upper portion of drone 0 is a unique feature and has several advantages. For example, in configurations where the modular payload includes a optical device 1, the position of optical device 1 atop drone 0 will provide a more advantageous field of view, especially when drone 0 is perched on a landing surface such as the edge of a building. Likewise, positioning optical device 1 atop drone 0 allows the optical device 1 to capture imagery/video even when docked in a base station. Further, in either configuration, positioning the modular payload atop drone 0 provides easy access for accessing and/or swapping out the modular payload. As configured, drone 0 does not necessarily need to be turned upside down or otherwise picked up/manipulated in order to access the modular payload, which can be a significant benefit in terms of ease of use especially in dangerous environments like the battlefield.

In various embodiments, second portion 62 of elongate body 2 may define a tail 9 of drone 0. Tail 9, in various embodiments, may be shaped in order to utilize gravity and geometry to guarantee a centered dock every time, as later described in more detail. Tail 9, in various embodiments, may have a positive electrical contact 6 and a ground contact 7, which allows the drone 0 to land in a base station and charge upon contact with complementary charging contacts positioned in the base station. Tail 9, in various embodiments, may further include a battery compartment 4 (see FIG. 1), which provides electrical power to the electrical components of the drone 0, and an infrared camera 11 (see FIG. 5), which may be configured to detect a complementary infrared beacon in a base station to facilitate landing drone 0. As shown in FIG. 2 and FIG. 3, in some embodiments, what is labeled as the battery compartment 4 in FIG. 1 may include spaces for both a battery and a secondary payload.

Figure 6:
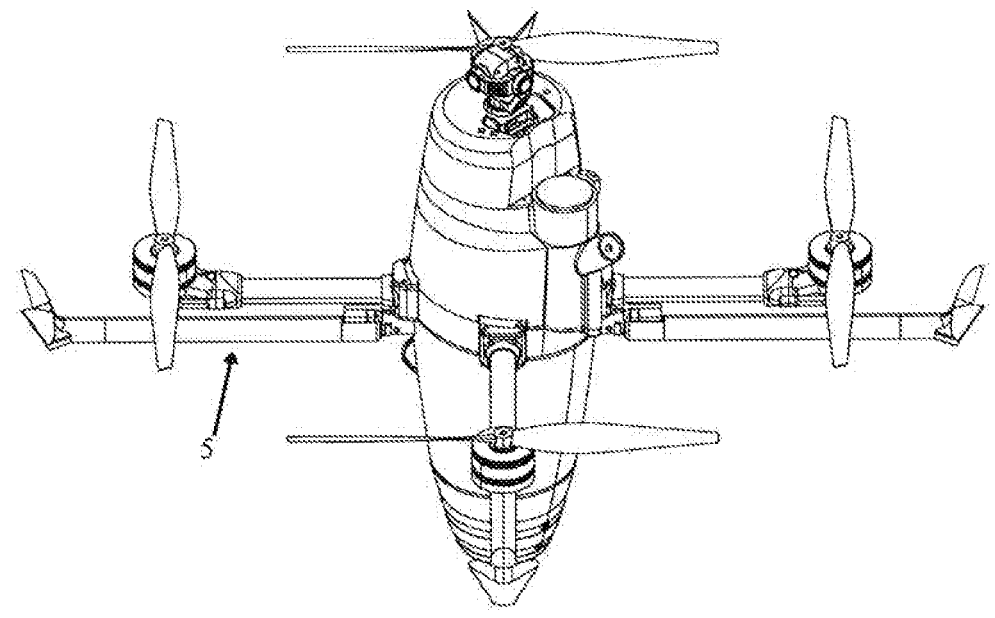
FIG. 6 shows an isometric view of the drone in flight mode.

Drone 0, in various embodiments, may further comprise landing gear 5. Landing gear 5, in various embodiments, may extend past a distal end of second portion 62 of elongate body 2 such that drone 0 can land on a landing surface with first portion 61 of elongate body 2 pointing substantially upwards and second portion 62 of elongate body 2 pointing substantially downwards towards the landing surface. Landing gear 5, in various embodiments, may comprise landing feet 8 at a distal end thereof for stabilizing drone 0 on the landing surface. Landing gear 5, in some embodiments, may be static and, in other embodiments, landing gear may be retractable. In an embodiment of a retractable configuration, landing gear 5 may lowered by an electronically powered motor 3 for landing on a landing surface such as the ground, a tall structure, or a base station and raised during flight so as to minimize aerodynamic drag. FIG. 6 illustrates landing gear 5 in a retracted configuration for flight mode.

Base Station 12

Figure 7:
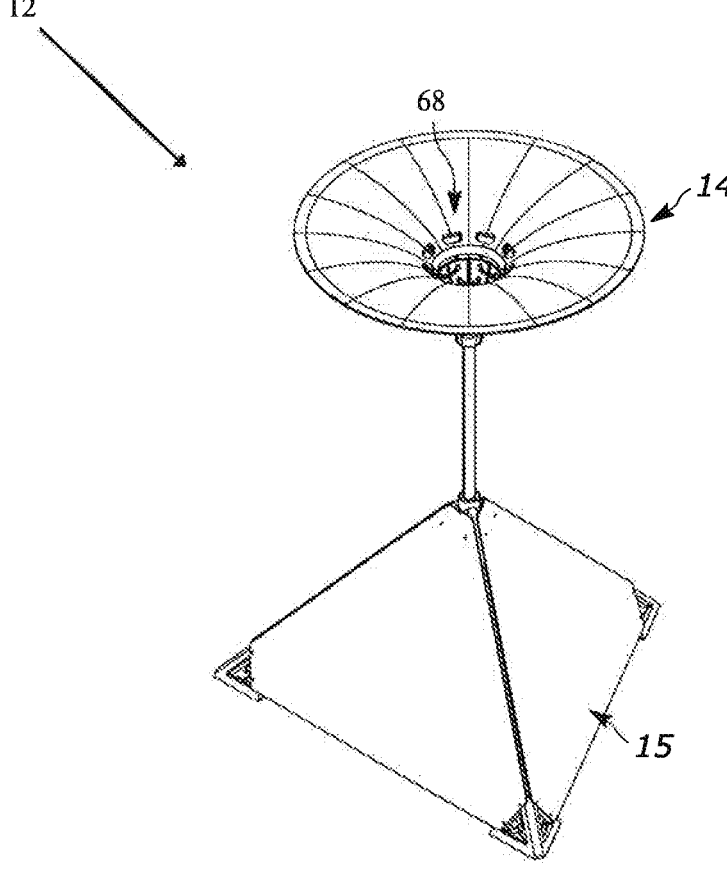
FIG. 7 shows an isometric view of the base station.
Figure 8:
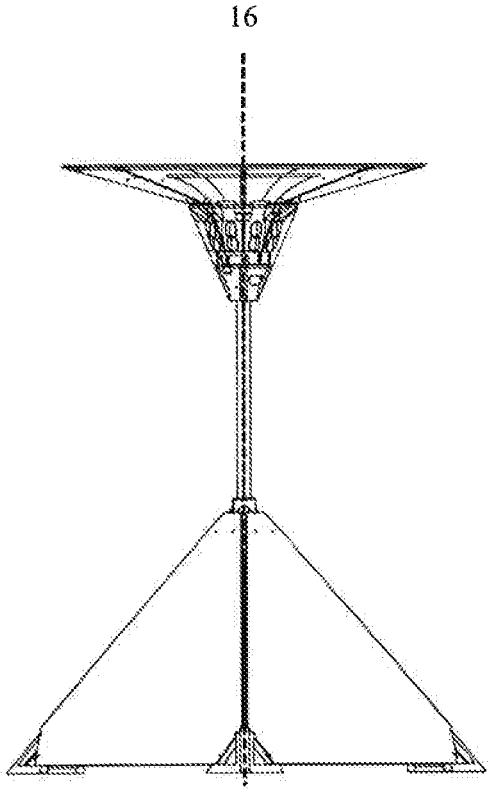
FIG. 8 shows a side view of the base station.
Figure 9:
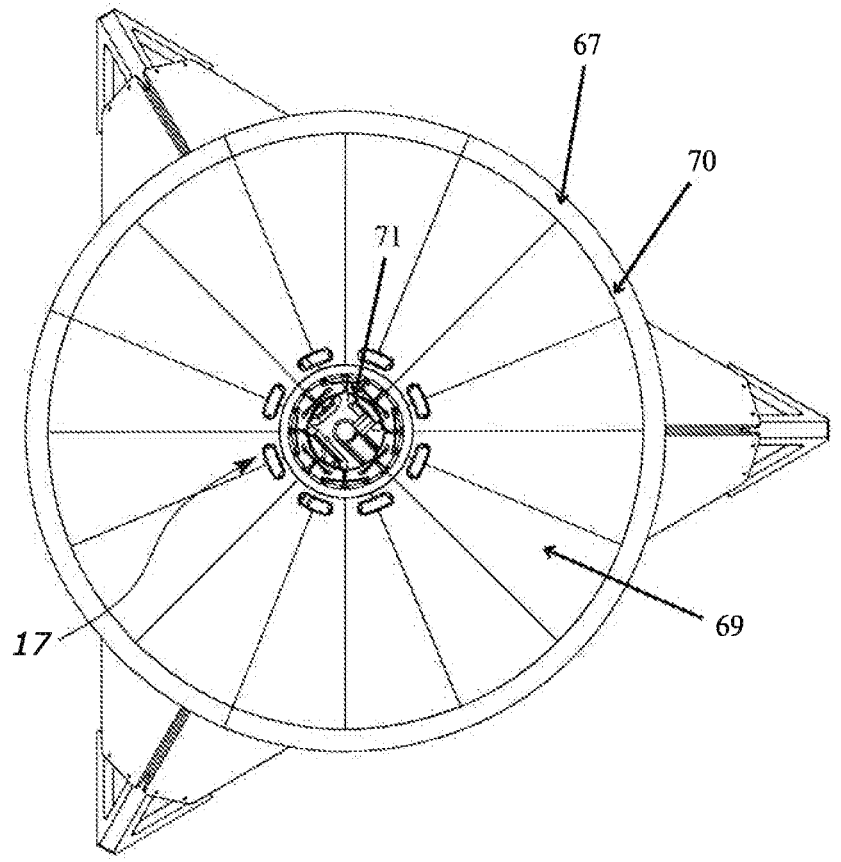
FIG. 9 shows a top view of the base station.

FIGS. 7-9 show multiple angles of an embodiment of a base station 12. Base station 12, in various embodiments, may be configured to serve as a landing platform on which drone 0 may recharge, download firmware updates and mission parameters, and/or upload captured imagery and data. Additionally, or alternatively, base station 12, in various embodiments, may be configured to serve as a node in a communications network through which various instructions and data may be relayed to/from other nodes in the network, as later described in more detail. As with drone 0, it should be noted that while different reference numbers may be used for base station 12 when describing the systems and methods discussed in the context of FIGS. 10-18 (e.g., base station 22, base station 26, base station 29, base station 38, base station 41, base station 47, base station 56), each generally refers to the various embodiments of base station 12 described herein Base station 12, in various embodiments, may include a base 15, which houses its power source, networking components, and computer components. On top of base 15 is a receiving funnel structure 14, which includes a horizontal surface 67, a recess 68 extending below the horizontal surface 67, the recess 68 having walls 69 that slope inwards from an upper opening 70 of the recess to a bottom 71 of the recess 68. Recess 68, in various embodiments, may be conical or convex in shape. As configured, the sloped walls 69 may guide a portion of drone 0 extending below the rotor(s) 10 of the drone 0 (e.g., tail 9) towards a centerline 16 of the recess 68 prior to the drone 0 coming to rest. In operation, drone 0 may approach base station 12, detect infrared light emitted from an infrared beacon 17 on funnel structure 14 via infrared camera 11 on drone 0, and descend towards funnel structure 14 by tracking a relative position of drone 0 to infrared beacon 17 until tail 9 enters opening 70 in funnel structure 14. Drone 0 may continue to descend, thereby inserting tail 9 into recess 68 through opening 70, where sloped walls 69 contact and thus guide tail 9 towards bottom 71 of recess 68. The profile of the base station 12 is compact and may be connected to the internet and/or a power source.

One or more dimensions of recess 68, in various embodiments, may be configured such that rotor(s) 10 remain above horizontal surface 67 when drone 0 comes to rest in funnel structure 14. As configured, the blades of rotor(s) 10 will not come into contact with sloped walls 69 during landing or takeoff, thereby minimizing the changes of rotor damage during landing and takeoff. Further, such a configuration can help reduce the footprint of funnel structure 14 as recess 68 need not be wide enough to accommodate the full span of drone 0 including rotor(s) 10. As such, base station 12 may be lighter weight and take up less space, thereby allowing it to be mounted on a variety of structures such as rooftops, utility poles, and the like. Still further, such a configuration places the modular payload higher up relative to horizontal surface 67 which can increase a field of view of optical device 1 when docked.

In one such embodiment, the depth of recess 68 is smaller than a length of the portion of drone 0 extending below rotor(s) 10 (e.g., second portion 62/tail 9) such that bottom 71 of recess 68 blocks further insertion of the lower portion of drone 0 into recess 68, thereby causing rotor(s) 10 to remain above horizontal surface 67 when drone 0 comes to rest in funnel structure 14. In another embodiment, the width of recess 68 becomes smaller than a width of the portion of drone 0 extending below rotor(s) 10 (e.g., second portion 62/tail 9) such that sloped walls 69 block further insertion of the lower portion of drone 0 into recess 68, thereby causing rotor(s) 10 to remain above horizontal surface 67 when drone 0 comes to rest in funnel structure 14. In yet another embodiment, opening 70 of recess 68 is smaller than a span of drone 0 such that at least a portion of drone 0 (e.g., arms 66) contacts horizontal surface 67, thereby causing rotor(s) 10 to remain above horizontal surface 67 when drone 0 comes to rest in funnel structure 14.

It should be recognized that base station 12 of the present disclosure need not necessarily take on the specific architecture shown in FIGS. 7-9 (e.g., a separate funnel structure

14 raised above a base 15) so long as the core features of funnel structure 14 are present. For example, base station 12 may comprise a base 15 having a body with an upper surface (e.g., horizontal surface) in which recess 68 with sloped walls 69 is formed (not shown). One having ordinary skill in the art will recognize various architectures utilizing the concepts described herein and the present disclosure of base station 12 is not intended to be limited to any one particular architecture. Likewise, base station 12 need not necessarily be utilized with a drone having the specific architecture of drone 0, but rather can be utilized with any drone having a lower portion extending below its rotor(s) 10 that can be accommodated by recess 68 and, as such, the present disclosure of base station 12 is not intended to be limited to use with any one particular drone architecture.

Systems & Networks for Continuous Surveillance
100

Representative Architectures

Figure 10:
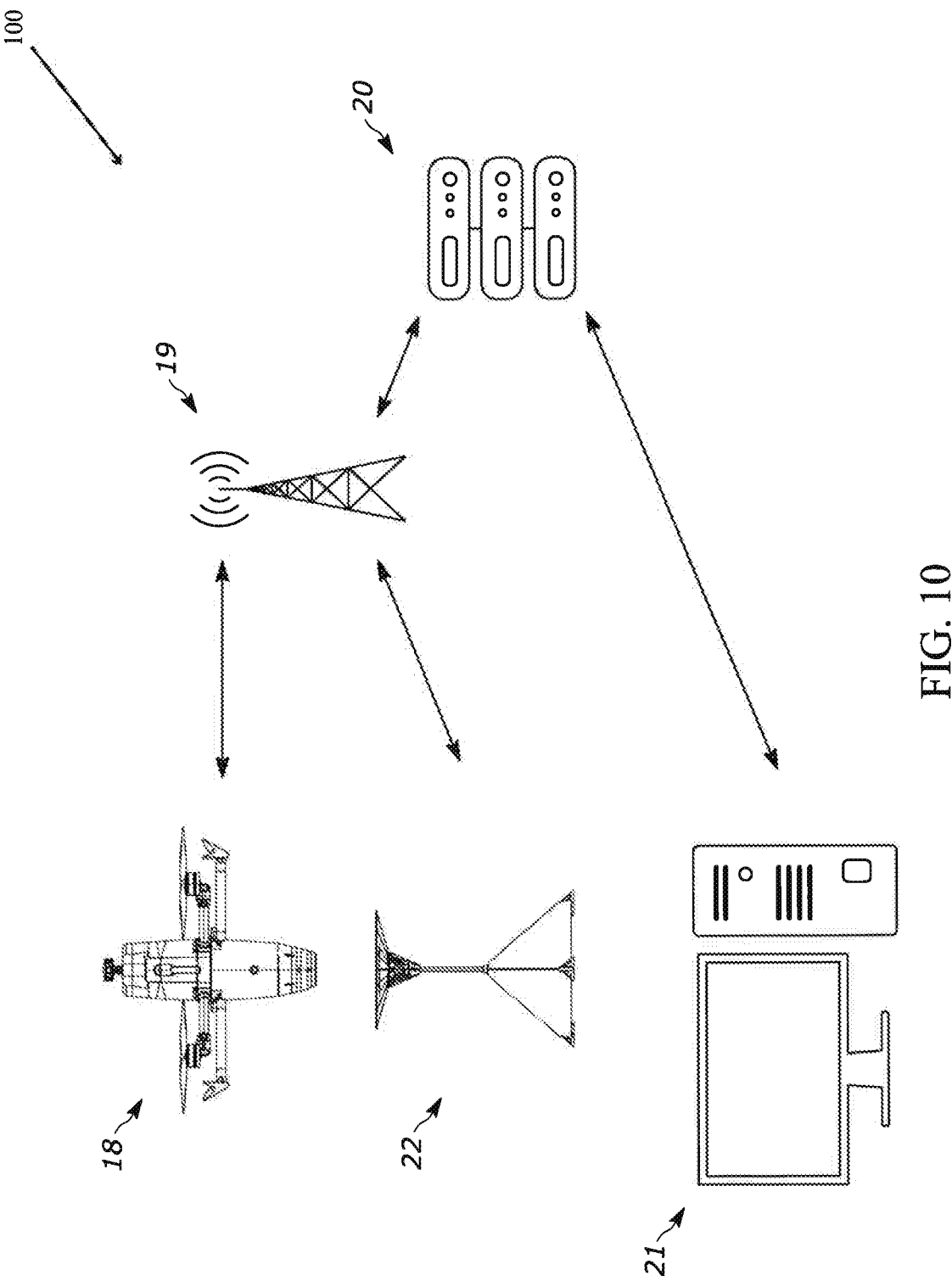
FIG. 10 shows a simplified breakdown of the internet application communicating with the drone and base station.

FIG. 10 shows an embodiment of a system 100 for controlling one or more drones 18 for maintaining long term, continuous surveillance of a target location situated remotely from central architecture and/or a user. System 100, in various embodiments, may include a drone(s) 18, a base station(s) 12, a communications node access point 19, a server 20, and a user terminal 21. Generally speaking, user terminal 21 may connect to server 20 (e.g., a cloud-based server) located remotely from user terminal 21 and the target location via a secure internet connection, and server 20 may be configured to communicate with drone(s) 18 and base station(s) 22 via node 19, such as a cellular tower. As configured, a user can remotely monitor operation of drone(s) 18 and optionally provide one or a combination of manually input commands via user terminal 21. Additionally, or alternatively, server 20 may automatically generate commands for controlling operation of drone(s) 18.

Figure 11:
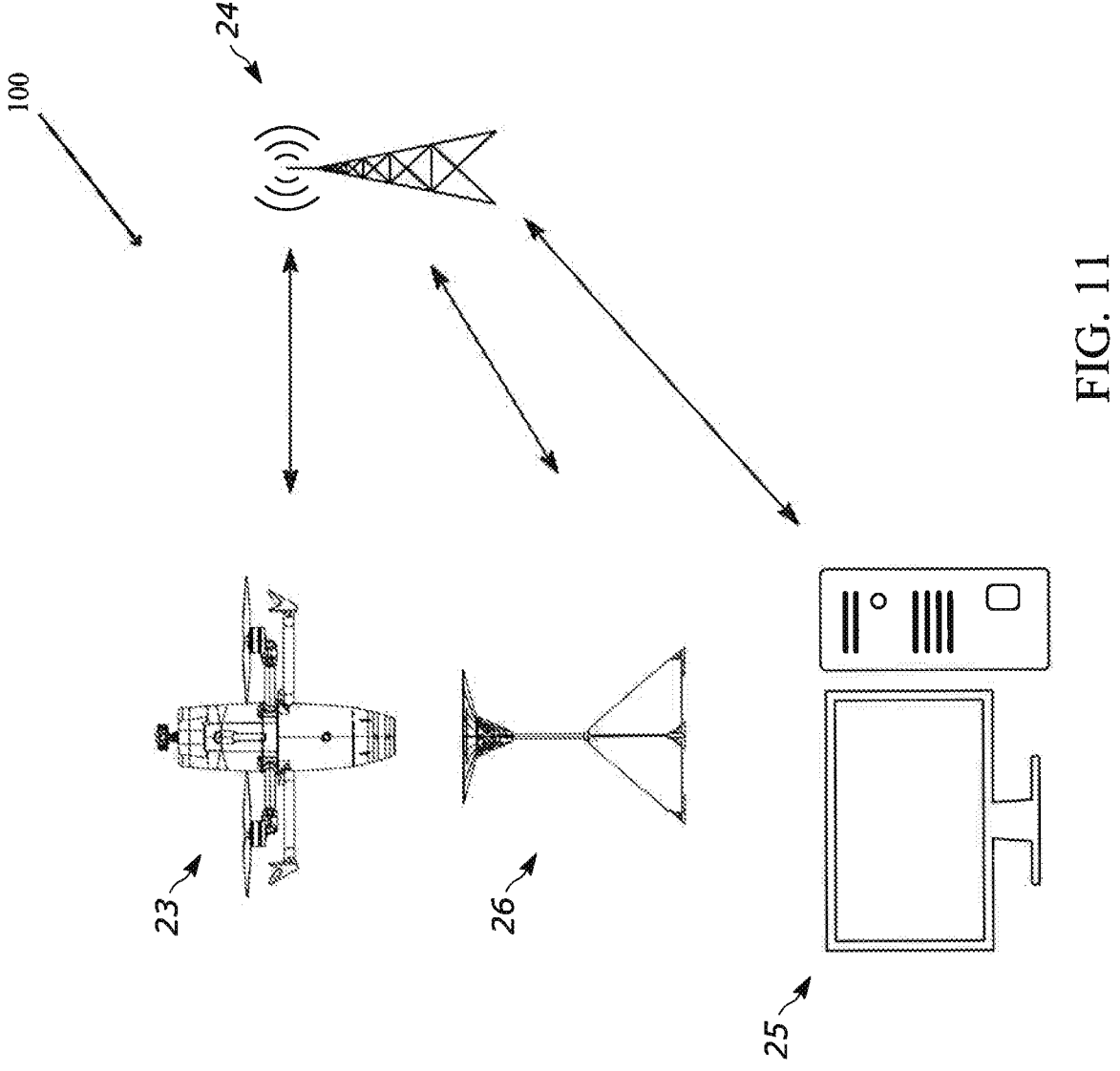
FIG. 11 shows a simplified view of the internet application communicating with the drone to land on a building.

FIG. 11 shows an embodiment of system 100 in which a server 25 remote from the target location, but local to a user. Server 25 may be configured to communicate with drone(s) 23 and base station(s) 26 through a communications node access point 24, such as a cellular tower. This embodiment offers a different application for implementations where connection to the Internet is not available.

Figure 12:
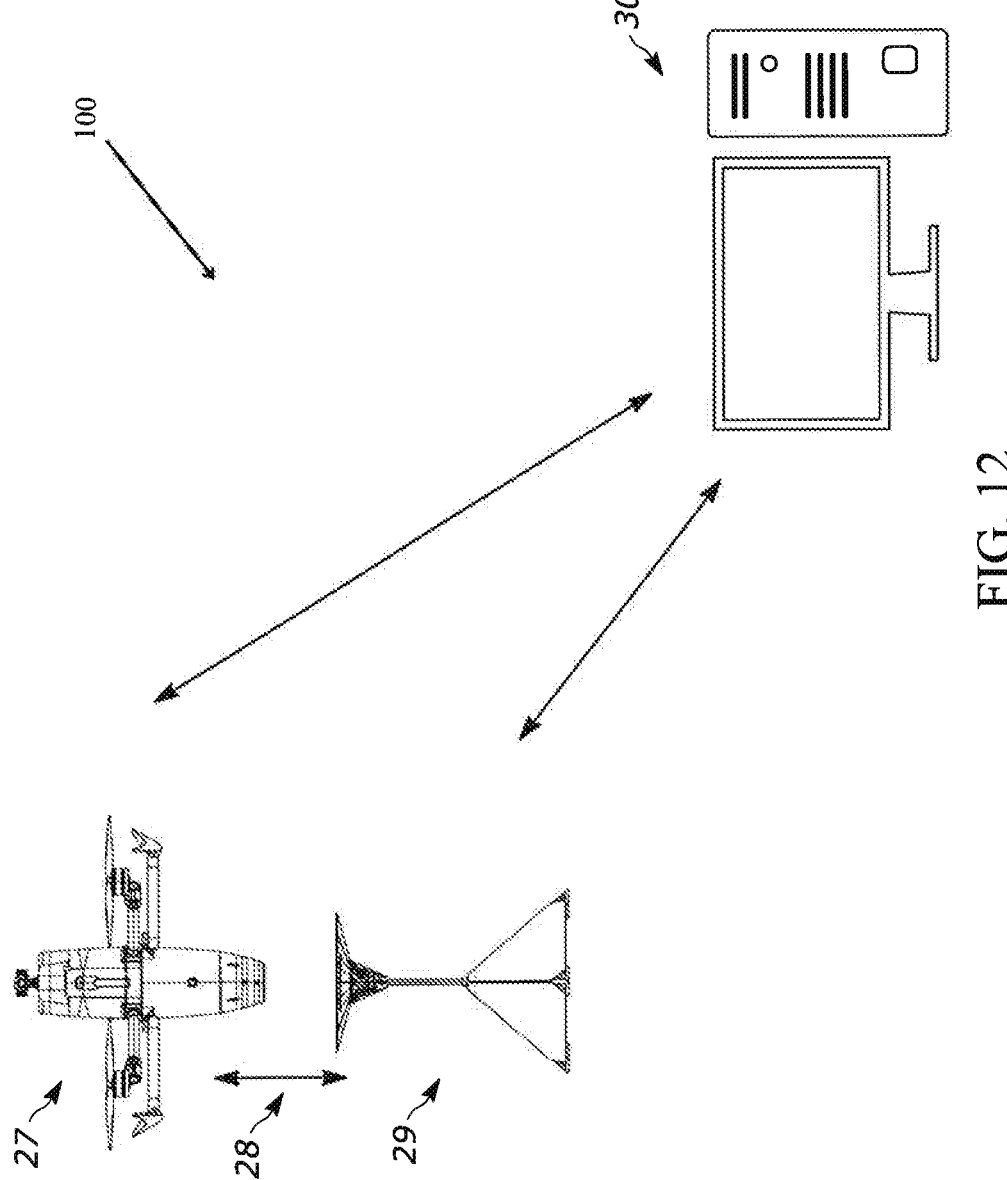
FIG. 12 shows a simplified view of the internet application communicating with multiple drones across multiple cells of a network.

FIG. 12 shows an embodiment of system 100 in which a server 30 is local to the target location and connected to drone 27 and base station 29 through a local network connection. In an embodiment, the local network is a mesh network amongst drone(s) 27, base station(s) 29, and server 30, as shown. In other words, drone(s) 27 and base station(s) 29 serve as nodes in the network and, in part, relay information between each other 28 thereby removing the need of a centralized server or operating device.

Figure 14:
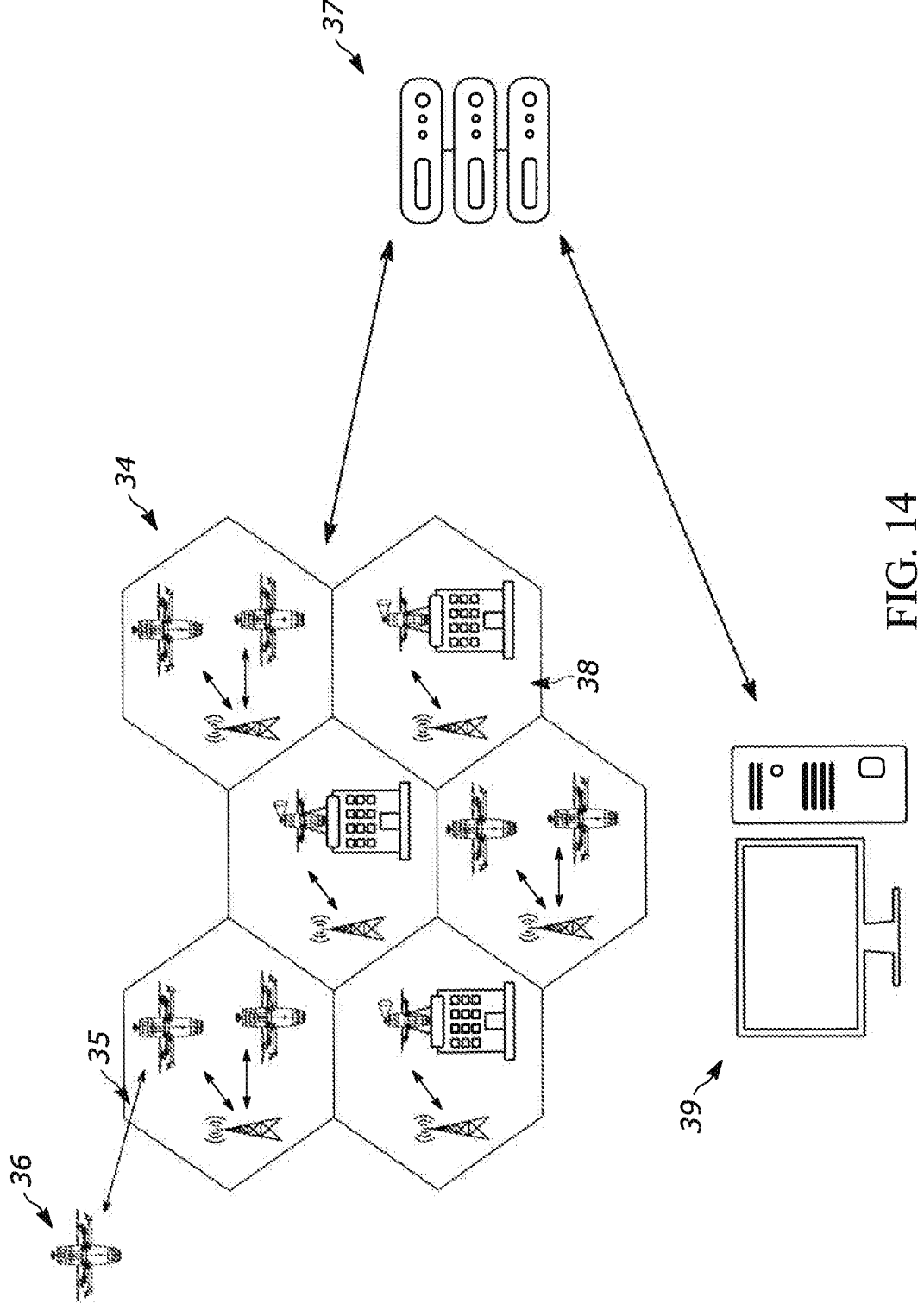
FIG. 14 shows the process of the drone landing in a base station to charge then taking off again.

Referring ahead to FIG. 14, shown is an embodiment of system 100 similar to that of FIG. 10 but operating across a large region and communicating with multiple node cells and multiple drones 36 and base stations 38 at once. Server 37 and/or a user (via user terminal 39) may monitor and control drones 36 across multiple node clusters 34. At any given time in a given node environment, some drones 36 may be flying and some drones 36 may be perched on structures or base stations 38. In the case a drone 36 leaves the service area of a node 34, other drones 36 in the service area can relay the node connection 35 to the drone 36 that left, for example via 802.11 wi-fi mesh network or GSM cellular radio, which adds redundancy and active range for the flight network.

Figure 15:
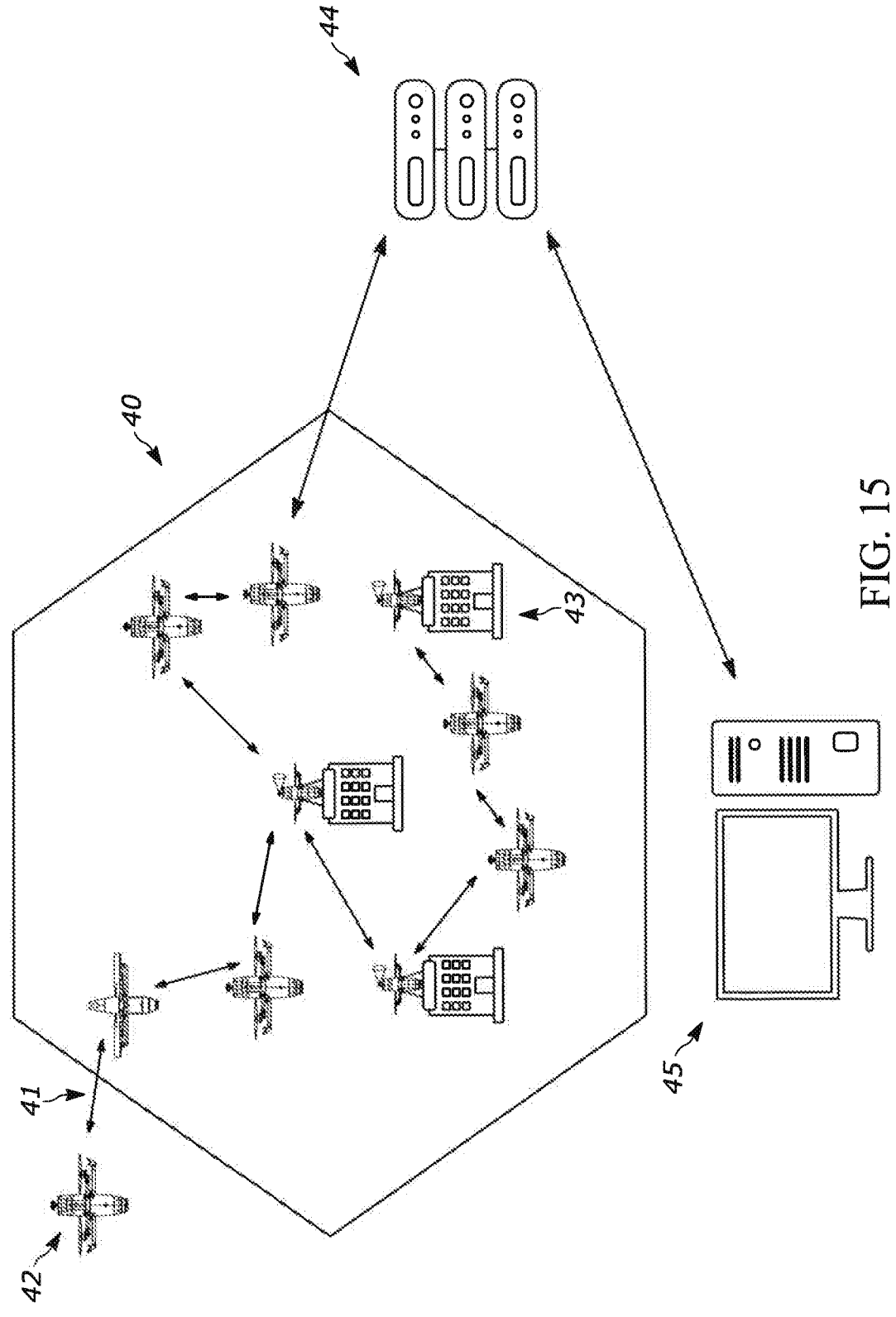
FIG. 15 shows a system similar to that of FIG. 10 and FIG. 14 in which the system operates across a large region, but with drones and base stations working as a mesh network connected to a server.
Figure 16:
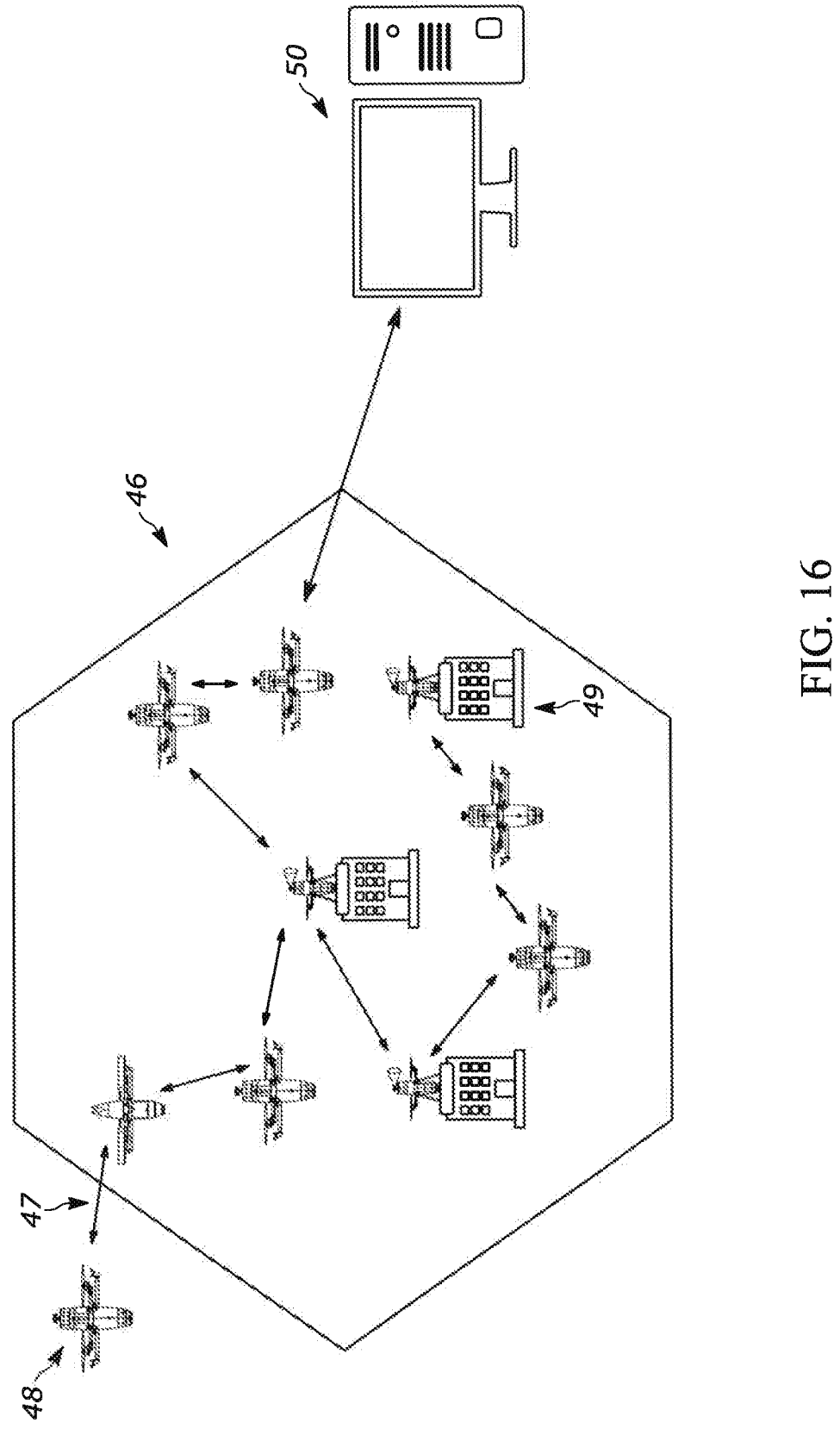
FIG. 16 shows a system similar to that of FIG. 15 in which the system operates across a large region with drones and base stations working as a mesh network, but connected to a local server rather than a remote server.

FIG. 15 shows an embodiment of system 100 similar to that of FIG. 10 and FIG. 14 in which system 100 operates across a large region, but with drones 42 and base stations 41 working as a mesh network connected to server 44. Server 44 and/or a user (via user terminal 45) may monitor and control drones 36 through a connection to the mesh network in environment 40, where communications are relayed between drones 42 and base stations 41 and can execute commands like landing on a building for surveillance 43. At any given time in environment 40, some drones 42 may be flying and some drones 42 may be perched on structures or base stations 41. In the case a drone 42 leaves the service area of environment 40, other drones 42 in the service area can relay the mesh network connection 41 to the drone 42 that left, for example via 802.11 wi-fi mesh network or GSM cellular radio, which adds redundancy and active range for the flight network. FIG. 16 shows an embodiment of system 100 similar to that of FIG. 15 in which system 100 operates across a large region with drones 48 and base stations 49 working as a mesh network but connected to a local server 50 rather than a remote server.

Controlling Deployment and Recall

Figure 13:
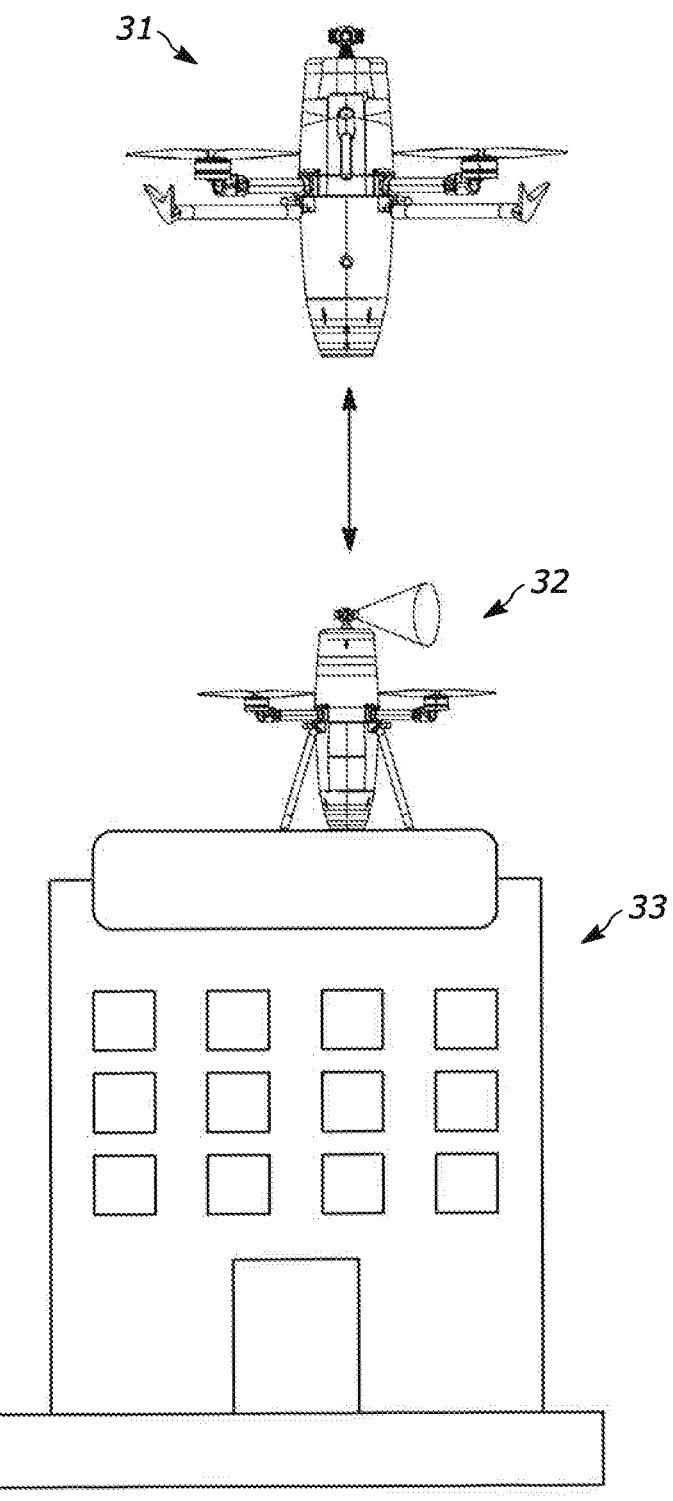
FIG. 13 shows the process of the drone identifying a landing zone on a structure, landing, surveying, and taking off again.

Referring now to FIG. 13, shown is a representative method for leveraging system 100 to deploy a drone 31 to a tall structure 33 to surveil a target location. In an embodiment, a user may access the server through a user terminal and enter instructions for drone 31 to deploy to tall structure 33. The server may receive and process the user command to, in turn, automatically generate corresponding instructions to drone 31 navigate to tall structure 33, identify a suitable landing spot thereon for surveilling the target location, and land at the landing spot. The server instructions may then send these instructions to drone 31 via a network. Drone 31 may receive and automatically execute the server's instructions, raising its landing gear after taking off and lowering its landing gear while descending to the landing spot. Once the drone 31 lands on top of the structure 33, the drone 31 perches and obtains optimal vantage point 32.

Figure 17:
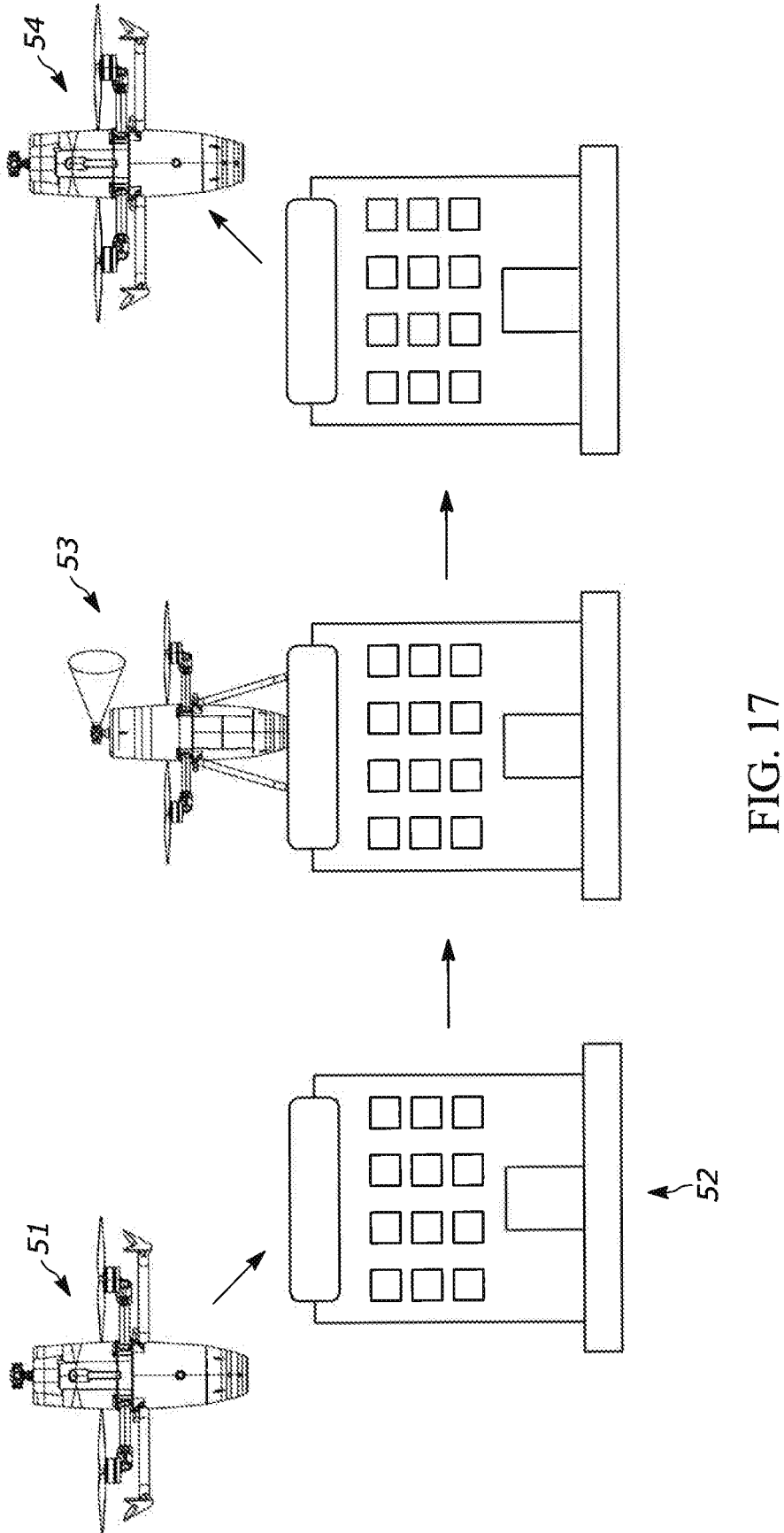
FIG. 17 shows a representative method for recalling or moving a drone from the target location.

Referring ahead to FIG. 17, in various embodiments, system 100 may be used to recall or move a drone 51 from the target location in a similar manner. In an embodiment, a user may access the server through a user terminal and enter instructions for drone 51 to return from tall structure 52 or move to another perch location. The server may receive and process the user command to, in turn, automatically generate corresponding instructions to drone 31 navigate from the tall structure 33 to the desired location, such as a base station, and land at the desired location. The server instructions may then send these instructions to drone 51 via a network. Drone 51 may receive and automatically execute the server's instructions, taking off from perched position 53 and raising its landing gear while flying off 54, and lowering its landing gear while descending to the desired location.

Figure 18:
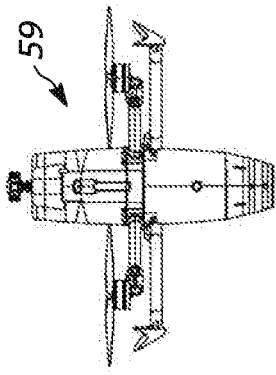
FIG. 18 is a representative method for docking a drone at a base station for recharging.
Figure 18:
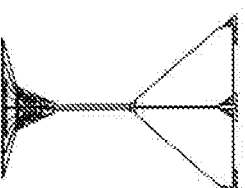
Figure 18:
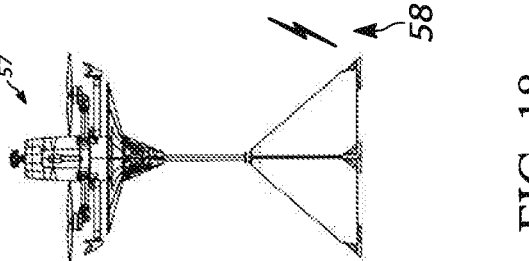
Figure 18:
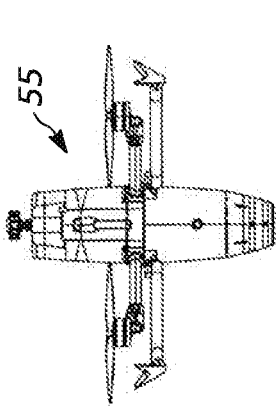
Figure 18:
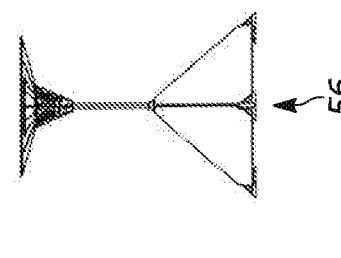

Continuing to FIG. 18, shown is a representative method for docking a drone 55 at a base station 56 for recharging. The drone 55 comes to the base station 56, and positions itself to land. The drone 55 flies over the base station to find the infrared beacon with its infrared camera. Once the infrared camera finds the infrared beacon and base station 56, the drone 55 lowers landing gear and lowers to dock with the base station 56. Once the drone tail is past the threshold of the base station cone, the walls of the cone will guide the drone tail down for a perfectly centered dock. Once the drone 55 is in a docked position 57 in the base station 56, the base station 56 will begin charging the drone's 55 internal battery 58. Once the drone's 55 battery is fully charged, the drone 55 will take off from the base station 56, raise its landing gear, and fly away 59.

Additionally, or alternatively to the preceding embodiments of FIG. 13, FIG. 17, and FIG. 18, the server may automatically generate instructions for deploying, moving, or docking the drone without first receiving any instructions from a user. As later described in more detail, the server may do so in response to receiving information indicating that such a deployment, move, or docking should be made.

Maintaining Continuous Surveillance of Target Location

Figure 19:
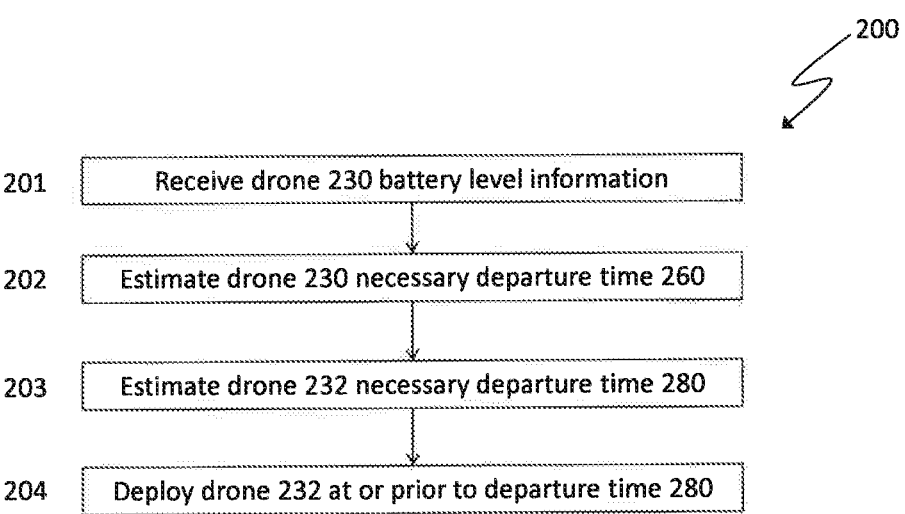
FIG. 19 is a flow chart illustrating a representative method for automatically controlling a plurality of uncrewed aerial vehicles for maintaining long-term, continuous surveillance of a target location.

FIG. 19 is a flow chart illustrating a representative method 200 for automatically controlling a plurality of uncrewed aerial vehicles for maintaining long-term, continuous surveillance of a target location. Method 200, in various embodiment, may be implemented by the server of system 100 as set forth in more detail below. Generally speaking, the server of system 100 may include one or more physical processors and non-transitory computer-readable media storing instructions executable by the one or more physical processors to issue performing various methods described herein, as later described in more detail. In some embodiments, the server may automatically generate commands for controlling the drones in response to receiving input from a user, while in other embodiments, the server may automatically generate such commands in response to information received from the drones and/or base stations of their respective networks. In still further embodiments, these servers may automatically generate such commands in response to both. For the purposes of method 200: the server will be referred to as server 220; drones will be referred to as drone 230, 231, etc.; and base stations will be referred to as base station 240, 241, etc.

Method 200, in various embodiments, may begin with step 201 in which the server 220 may receive, from a first drone 230 deployed at a target location 250, information concerning a battery level of first drone 230. This information, in various embodiments, may include the percentage of power remaining, a quantitative measure of battery level in power units, or any other information from which the available battery power can be deduced.

In step 202, server 220 may estimate, based on the information received from first drone 230 and a distance between the target location 250 and a location of a base station 240, a first time 260 by which the first drone 230 must depart from the target location 250 in order to reach the base station 240. In a basic approach, server 220 may simply divide the distance by an average cruising speed of first drone 230. Of course, the distance may not be a straight-line distance, especially if it is necessary or otherwise desirable for first drone 230 to follow a flight path configured to navigate obstacles and other hazards, restricted airspace, populated areas, areas with poor communications signal, and the like. Likewise, various factors could affect the flight speed of first drone 230 such as wind and weather. Still further, various factors could affect the rate of battery drain such as cold temperatures. Collectively, such factors may be referred to herein as "flight conditions." One of ordinary skill in the art will recognize without undue experimentation how to account for such factors in estimating the associated flight time between the target location 250 and the location of base station 240 and, in turn, determine the first time 260 by which the first drone 230 must depart from the target location 250 in order to reach the base station 240 before reaching critical battery level or some other threshold battery level.

In step 203, server 220 may estimate, based on a distance between the target location 250 and a location 270 of a second drone 231, a second time 280 by which the second drone 231 must depart to reach the target location 250 prior to the first time 260. Similar approaches as used in step 202 (including consideration of flight conditions) may be utilized to estimate the flight time and, in turn, the second time 280 by which the second drone 231 must depart to reach the target location 250 prior to the first time 260.

In step 204, server 220 may deploy, at or prior to the second time 280, the second drone 231 to the target location 250. In this manner, the second drone 231 may reach the target location before the first drone 230 must leave, thereby maintaining a continuous drone presence at the target location 250.

In some embodiments, second drone 231 may not land, but rather loiter, hover, or otherwise remain airborne to surveil the target area, while in other embodiments, server 220 may command second drone 231 to land to conserve battery power while surveilling the target area. In an embodiment in which second drone 231 is commanded to land, second drone 231 may land next to or otherwise nearby first drone 230 prior to first drone 230 leaving. First drone 230, in turn, may leave at or prior to the specified time and/or receive notice, either directly from second drone 231 or indirectly from server 220, that second drone 231 has landed on-scene and then depart in response.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An uncrewed aerial vehicle comprising:

an elongate body having (i) a first portion that comprises (a) a first section that comprises a modular payload and (b) a second section to which the first section is removably attachable, and (ii) a second portion that is fixedly coupled to the second section of the first portion and that comprises a tail along a distal end, wherein the first and second portions are separated by a latitudinal plane that is perpendicular to a longitudinal axis of the elongate body, wherein a length of the elongate body along the longitudinal axis is greater than a width of the elongate body along the latitudinal plane, and wherein the tail is adapted for use by a base station with a conical opening, the tail being shaped in order to utilize gravity and geometry to achieve a centered landing with respect to the base station and connection between an electrical contact located in the tail and another electrical contact of the base station;

one or more rotors positioned along the latitudinal plane; and landing gear that when extended, extends past the distal end of the second portion of the elongate body, such that the uncrewed aerial vehicle is able to land on a landing surface other than the base station with the first portion pointing substantially upwards and the second portion pointing substantially downwards.

2. The uncrewed aerial vehicle of claim 1, wherein the one or more rotors comprise two or more rotors that are circumferentially spaced apart from one another about an exterior of the elongate body.

3. The uncrewed aerial vehicle of claim 2, wherein each of the two or more rotors is mounted to a distal end of one or more arms extending outwards from the elongate body.

4. The uncrewed aerial vehicle of claim 3, wherein a first end of the landing gear is configured to contact the landing surface, and wherein a second end of the landing gear is rotatably coupled to the uncrewed aerial vehicle via a rotatable coupling and is configured to selectably rotate about the rotatable coupling such that the landing gear is situated against or within the one or more arms when in a retracted position.

5. The uncrewed aerial vehicle of claim 1, wherein the one or more rotors comprises a single rotor having a plurality of rotor blades extending outwards beyond the elongate body and a rotation axis substantially coincident with the longitudinal axis of the elongate body.

6. The uncrewed aerial vehicle of claim 1, wherein an entirety of the first portion is removably attachable to the second portion.

7. The uncrewed aerial vehicle of claim 1, wherein the modular payload comprises an optical device.

8. The uncrewed aerial vehicle of claim 7, wherein the optical device is positioned at an upper end of the uncrewed aerial vehicle when the uncrewed aerial vehicle is resting on the landing surface.

9. The uncrewed aerial vehicle of claim 1, wherein the modular payload comprises a container having a hollow interior for receiving a delivery item.

10. An uncrewed aerial vehicle comprising:

an elongate body having (i) a first portion that comprises a modular payload, and (ii) a second portion that comprises a tail along a distal end, wherein the first and second portions are separated by a latitudinal plane that is perpendicular to a longitudinal axis of the elongate body, wherein a length of the elongate body along the longitudinal axis is greater than a width of the elongate body along the latitudinal plane, wherein the tail is adapted for use by a base station, the tail being shaped in order to utilize gravity and geometry to achieve a centered landing with respect to the base station and connection between an electrical contact located in the tail and another electrical contact of the base station;

two or more rotors that are positioned along the latitudinal plane and that are circumferentially spaced apart from one another about an exterior of the elongate body, wherein each of the two or more rotors is mounted to a distal end of one or more arms extending outwards from the elongate body; and landing gear that when extended, extends past the distal end of the second portion of the elongate body, such that the uncrewed aerial vehicle is able to land on a landing surface other than the base station with the first portion pointing substantially upwards and the second portion pointing substantially downwards, wherein a first end of the landing gear is configured to contact the landing surface, and wherein a second end of the landing gear is rotatably coupled to the uncrewed aerial vehicle via a rotatable coupling and is configured to selectably rotate about the rotatable coupling such that the landing gear is situated against or within the one or more arms when in a retracted position.

11. The uncrewed aerial vehicle of claim 10, wherein an entirety of the first portion is removably attachable to the second portion.

12. The uncrewed aerial vehicle of claim 10, wherein the first portion of the elongate body comprises a first section fixedly coupled to the second portion of the elongate body, and a second section defined by the modular payload, the second section being configured to removably attach to the first section.

13. The uncrewed aerial vehicle of claim 12, wherein the modular payload comprises an optical device.

14. The uncrewed aerial vehicle of claim 13, wherein the optical device is positioned at an upper end of the uncrewed aerial vehicle when the uncrewed aerial vehicle is resting on the landing surface.

15. The uncrewed aerial vehicle of claim 12, wherein the modular payload comprises a container having a hollow interior for receiving a delivery item.

\* \* \* \* \*